United States Patent [19]
Mayer

[11] Patent Number: 5,563,213
[45] Date of Patent: Oct. 8, 1996

[54] FINELY PARTICULATE DISPERSIONS OF THERMOPLASTIC FLUOROPOLYMERS

[75] Inventor: Ludwig Mayer, Burghausen, Germany

[73] Assignee: Hoechst Aktiengesellschaft, Germany

[21] Appl. No.: 475,934

[22] Filed: Jun. 7, 1995

Related U.S. Application Data

[63] Continuation of Ser. No. 199,502, Feb. 22, 1994, abandoned.

[30] Foreign Application Priority Data

Feb. 24, 1993 [DE] Germany ............... 43 05 619.0

[51] Int. Cl.$^6$ ................................................ C08L 27/12
[52] U.S. Cl. ................................. 524/805; 526/24
[58] Field of Search ............................................ 524/805

[56] References Cited

U.S. PATENT DOCUMENTS

| | | |
|---|---|---|
| 3,635,926 | 1/1972 | Gresham et al. . |
| 3,721,638 | 3/1973 | Sianesi et al. ............... 524/805 |
| 4,391,940 | 7/1983 | Kuhls et al. . |
| 4,395,445 | 7/1983 | Gebauer et al. . |
| 4,612,357 | 9/1986 | Bekiarian et al. ............... 524/805 |
| 5,188,764 | 2/1993 | Shimizu et al. ............... 524/805 |
| 5,296,165 | 3/1994 | Shimizu et al. ............... 524/805 |

FOREIGN PATENT DOCUMENTS

| | | |
|---|---|---|
| 146703 | 6/1950 | Australia ............... 524/805 |
| 499165 | 1/1954 | Canada . |
| 0193963 | 9/1986 | European Pat. Off. ............... 524/805 |
| 0220910 | 5/1987 | European Pat. Off. . |
| 0360575 | 3/1990 | European Pat. Off. ............... 524/805 |
| 689801 | 4/1953 | United Kingdom . |
| WO80/00929 | 5/1980 | WIPO . |
| WO92/07886 | 5/1992 | WIPO . |

*Primary Examiner*—Joseph L. Schofer
*Assistant Examiner*—N. Sarofin
*Attorney, Agent, or Firm*—Connolly and Hutz

[57] ABSTRACT

Aqueous dispersions having more than 18% by weight of a melt-processable bipolymer composed of units of tetrafluoroethylene and a fluoroalkyl perfluorovinyl ether and having a number-average particle size of at most 50 nm are suitable for coating porous substrates.

9 Claims, No Drawings

FINELY PARTICULATE DISPERSIONS OF THERMOPLASTIC FLUOROPOLYMERS

This application is a continuation of our application Ser. No. 08/199,502, filed Feb. 22, 1994, now abandoned.

DESCRIPTION

The invention relates to aqueous dispersions of thermoplastic polymers of tetrafluoroethylene and a fluoroalkyl perfluorovinyl ether, which dispersions have a solids content of over 18% by weight of the fluoropolymer which has a number-average particle size of at most 50 nm. Such dispersions are suitable for coating porous substrates.

Bipolymers of tetrafluoroethylene and from 0.5 to 11% by weight of copolymerized units of a perfluoro(alkyl vinyl) ether of the formula $CF_2=CF—OR$, in which R is a perfluoroalkyl radical having from 1 to 10 carbon atoms, are known from U.S. Pat. No. 4,395,445. Furthermore, it is known from U.S. Pat. No. 4,391,940 that dispersions of fluoropolymers can be prepared with the particles comprising a core of modified polytetrafluoroethylene and two shells. In the preparation of these particles, a "seed" which may contain up to 18% by weight of solids is prepared first. This seed dispersion comprises predominantly uniform round particles having an average diameter from 10 to 200 nm, preferably from 30 to 150 nm.

As used in the specification, and as apparent from U.S. Pat. No. 4,395,445, a "bipolymer" is a copolymer consisting essentially of two different repeating units.

Against that background, the invention provides aqueous dispersions which comprise more than 18% by weight of a melt-processable bipolymer of tetrafluoroethylene with units of a fluoroalkyl perfluorovinyl ether, with the polymer particles having a number-average size of at most 50 nm. Further aspects of the invention and preferred embodiments will now be more particularly described.

The fluoroalkyl perfluorovinyl ether is preferably of the formula $X—(CF_2)_n—O—CF=CF_2$, in which X is hydrogen, chlorine or preferably fluorine and n is a number from 1 to 8, preferably from 1 to 3. Particular preference is given to perfluoro(propyl vinyl) ether.

The dispersion preferably comprises from 19.5 to 25% by weight, in particular from 20 to 24% by weight, of fluoropolymer.

The polymer particles in the dispersion preferably have a number-average size of below 40 nm, for example 25±10 nm. A particular embodiment of the invention provides dispersions having particles with a particle size (number average) of below 30 nm, in particular 22.5±6 nm.

The dispersion may contain further customary components, which may either originate from the polymerization or be added subsequently. The type and amount of such additives will be familiar to those skilled in the art.

The dispersions of the invention can be prepared in a manner known per se by polymerization of tetrafluoroethylene with the fluoroalkyl perfluorovinyl ether in the presence of initiators, in particular of inorganic peroxides, and a chain-transfer agent, in particular dichloromethane, with addition of customary fluorinated emulsifiers, in particular a salt of perfluorooctanoic acid. The fluorinated emulsifier is advantageously added in an amount which is somewhat higher than is customary, for example in an amount from 0.1 to 0.15%, based on the mass of the polymerization liquor.

Otherwise, the polymerization is carried out in the conventional manner, i.e. at temperatures from about 50° to about 90° C., preferably from about 60° to about 80° C. and in particular from about 65° to about 70° C. The polymerization pressure is from about 10 to about 20 bar, preferably from about 12 to 15 bar.

The polymerization is advantageously continued until the desired solids content is reached, so that it is not necessary to concentrate up to the desired use concentration. However, it is also possible, even if generally not advantageous, to continue the polymerization only until a lower solids content is reached and then to increase the concentration in a conventional manner, for example by ultrafiltration or by other gentle processes, with or without the addition of conventional stabilizers, until the desired use concentration is reached.

The dispersions of the invention are suitable for coating porous substrates, in particular surfaces having small pore diameters. Coatings which adhere well are thus obtained even on surfaces which cannot be coated satisfactorily, if at all, by conventional methods, i.e. after prior roughening or prior application of primers.

Suitable substrates are fiber materials such as textiles, leather, paper or wood, building materials such as bricks, plaster and rendering, tiles and the like, metallic surfaces, in particular oxidized metal surfaces, and hydrophobic surfaces such as graphite.

The invention is more particularly described in the examples below. Unless otherwise indicated, percentages are based on weight.

EXAMPLE 1

Into an internally enameled polymerization reactor having a total volume of 195, l provided with an impeller stirrer, are placed 118 l of deionized water and 620 g of ammonium perfluorooctanoate (POA, in the form of 2000 g of a 31% strength solution in water, commercial product of the 3M company) are dissolved therein. After sealing the reactor, it is first flushed five times with nitrogen and subsequently once with 1.0 bar of tetrafluoroethylene.

After depressurizing and heating to 68° C., 50 g of methylene chloride and 610 g of perfluoropropyl perfluorovinyl ether (PPVE; 0.75 bar) are pumped in via a line with moderate stirring. Stirring is then increased to 170 rpm. Tetrafluoroethylene (TFE) is then introduced into the reactor via the gas phase until a total pressure of 3.4 bar is reached. Subsequently, the polymerization is initiated by pumping in 4.0 g of ammonium persulfate (APS) dissolved in 300 ml of deionized water.

As soon as the pressure begins to fall, further TFE and PPVE are added via the gas phase according to consumption, so that the total pressure of 13.4 bar is maintained. The heat liberated is conducted away by cooling the reactor wall and a temperature of 68° C. is thus maintained.

After feeding in 35.7 kg of TFE (over a period of 4.1 hours) into the reactor, the supply of monomers is stopped, and the reactor depressurized and flushed a number of times with $N_2$.

The polymer dispersion obtained is drained off at the bottom of the reactor. 154.5 kg are obtained of a 23.8% by weight solids content bipolymer dispersion containing 4.1% by weight (1.54 mol %) of PPVE and having a melt flow index (MFI, determined in accordance with DIN 53 735/ASTM 1268-62 T, using a load of 5 kg, 372° C.) of 1.6. The melting point is 305° C., the particle size distribution 31 nm (average of the weight distribution) or 25 nm (average of the number distribution).

The examples in the table below were carried out in an analogous way:

TABLE

| Example | POA [g] | $CH_2Cl_2$ [g] | TFE [bar] | PPVE [bar] | APS [g] | Duration of run [h] | Stirring rate [rpm] | Final pressure [bar] | Dispersion [kg] | Solids content [% by wt.] | MFI | PPVE [% by wt.] | Weight average [nm] | Number average [nm] |
|---|---|---|---|---|---|---|---|---|---|---|---|---|---|---|
| 2 | 600 | 50  | 12.3 | 0.79 | 4 | 4.4 | 170 | 13.4 | 151.4 | 22.0 | 2.0 | 4.3 | 22 | 17 |
| 3 | 600 | 50  | 12.5 | 0.61 | 4 | 4.0 | 170 | 9.6  | 146.6 | 19.6 | 3.5 | 4.9 | 29 | 23 |
| 4 | 450 | 50  | 12.5 | 0.62 | 4 | 4.3 | 170 | 12.6 | 154.7 | 23.6 | 2.6 | 3.8 | 36 | 28 |
| 5 | 600 | 250 | 12.1 | 0.76 | 8 | 4.1 | 210 | 13.4 | 149.4 | 20.6 | 17  | 4.7 | 26 | 21 |

We claim:

1. An aqueous dispersion comprising >18% by weight of a melt-processable bipolymer consisting essentially of units of tetrafluoroethylene and a fluoroalkyl perfluorovinyl ether and having a number-average particle size of at most 50 nm.

2. A dispersion as claimed in claim 1, comprising from 19.5 to 25% by weight of the polymer.

3. A dispersion as claimed in claim 1 having a number-average particle size of at most 40 nm.

4. A dispersion as claimed in claim 1 having a number-average particle size of below 30 nm.

5. A dispersion as claimed in claim 1, wherein the fluoroalkyl perfluorovinyl ether units of said bipolymer consist essentially of units of a fluoroalkyl perfluorovinyl ether of the formula $X-(CF_2)_n-O-CF=CF_2$, in which X is hydrogen, chlorine or fluorine and n is from 1 to 6.

6. A dispersion as claimed in claim 5, wherein X is fluorine and n is from 1 to 3.

7. A porous substrate coated with a dispersion as claimed in claim 1.

8. An aqueous dispersion consisting essentially of particles with a number average particle size less than 50 nm which adhere to a surface when coated thereon, said aqueous dispersion consisting essentially of >18% by weight of melt-processable bipolymer particles consisting essentially of a tetrafluoro-ethylene/fluoroalkyl perfluorovinyl ether bipolymer.

9. The aqueous dispersion as claimed in claim 8, wherein said bipolymer contains 3.8 to 4.9% by weight perfluoropropyl perfluorovinyl ether units.

* * * * *